United States Patent [19]

Nuss

[11] 4,075,029

[45] Feb. 21, 1978

[54] INORGANIC PIGMENT COMPRISING A SOLID SOLUTION OF DIFFERING SPINELS

[75] Inventor: James W. Nuss, Rocky River, Ohio

[73] Assignee: Ferro Corporation, Cleveland, Ohio

[21] Appl. No.: 716,343

[22] Filed: Aug. 20, 1976

[51] Int. Cl.$^2$ .................. C09C 1/00; C01G 1/02
[52] U.S. Cl. .................. 106/288 B; 106/292; 106/299; 106/301; 106/302; 106/306; 106/304
[58] Field of Search .............. 106/288 B, 65, 62, 59, 106/299, 292, 302, 306, 301, 304

[56] References Cited

U.S. PATENT DOCUMENTS

| | | | |
|---|---|---|---|
| 2,139,686 | 12/1938 | Lederle et al. | 106/299 |
| 3,091,544 | 5/1963 | Hund et al. | 106/288 B |
| 3,214,283 | 10/1965 | Chopoorian | 106/299 |
| 3,282,713 | 11/1966 | McTaggart et al. | 106/59 |
| 3,342,616 | 9/1967 | Alper et al. | 106/59 |
| 3,424,551 | 1/1969 | Owen | 106/299 |
| 3,876,441 | 4/1975 | Broll et al. | 106/299 |

*Primary Examiner*—Patrick P. Garvin
*Assistant Examiner*—J. V. Howard
*Attorney, Agent, or Firm*—Milton L. Simmons; Wesley B. Taylor

[57] ABSTRACT

An inorganic pigment and its process of manufacture are disclosed, characterized in that the pigment, in contrast to substitution of one or more metal ions into a given spinel crystal structure, is a solid solution comprising at least a double spinel structure, that is, a first cubic spinel crystal structure containing within such lattice the spinel-forming metal oxides of at least a second, differing spinel. As a result, the present inorganic multiple spinel solid solution pigments can be varied over a wide range of compositional make-up and yet, conversely, easily adjust to even slight compositional changes by varying the amounts or components of the first spinel and/or the spinel-forming metal oxides. The resulting pigments correspondingly can produce a wide range of colors and are yet capable of even small nuances of changes in color.

44 Claims, 7 Drawing Figures

INORGANIC PIGMENT COMPRISING A SOLID SOLUTION OF DIFFERING SPINELS

BACKGROUND OF THE INVENTION

Pigments are widely used in many industries to impart basically a pleasing, esthetic color and appearance to various media in which they are mixed, such as paints, varnishes, organic resins, glazes, ceramic ware such as porcelain enamels, and the like. As a general rule, inorganic pigments have a greater scope of application as compared to organic pigments. Because of the more severe and drastic conditions of use in glazes and ceramic applications, particularly with reference to temperature of preparation, inorganic pigments must be used for such applications. However, inorganic pigments may also be added to organic media, such as organic resinous polymeric materials, especially when such materials are used at relatively high temperature such as in extruding or molding.

It is known to us a spinel as an inorganic pigment. Crystallographically, spinels are face-centered cubes or oxygen ions into which metal ions can be located in either tetrahedral or octahedral coordination spheres. Spinels comprise metal oxides in recognized groupings, usually expressed by formulas. A normal spinel crystal structure, for example, may be expressed as $AB_2O_4$ in which A may represent one ion or atom of a divalent metal and B represents two ions of a trivalent metal. It will be noted that the sum of the metal positive valences, eight, equals the total negative valence of the oxygen to maintain the spinel in electrical neutrality.

Prior work for developing spinels as inorganic pigments has been confined to the substitution of metal ions of similar charge in a host crystal system. There are two ways in which the substituted metal ion can fit into the spinel crystal structure. In one, the substituted ion fits into an occupied or unoccupied tetrahedral site within the crystal. In another, the substituted ion fits an occupied or unoccupied octadedral position in the host structure. While the resulting spinel crystal lattice structures in both instances have been referred to as solid solutions, they actually consist of only an original, single spinel crystal structure with one or more metal ions substituted in crystal sites normally occupied by other metal ions.

Thus, U.S. Pat. No. 2,139,686 to Lederle discloses forming crystals of the spinel type from meta and ortho zinc titante compositions in which a part of the zinc can be isomorphorically replaced by magnesium. Similarly, although U.S. Pat. 3,424,551 to Owen speaks of a pigment having a characteristic spinel structure and describes these spinels as solid solutions, this patent shows that only a single spinel crystal structure is intended by disclosing only one spinel formula, and by stating that the spinels pertaining to the invention of that patent may be represented by the formula $A^xB^y_2O_4$, in which the ionic charges of the A and B cations are such that the sum of these charges $(1x + 2y)$ equals eight; (column 1, lines 36 to 39). In like manner, U.S. Pat. No. 3,876,441 to Broll et al discloses a pigment having a spinel structure but limited to an alkali metal tinanate in which cobalt, zinc and cadmium are substituted in varying amounts, the ion substitutions of the three metals totaling one per molecule of the spinel, as expressed by a single formula, and in which tin may also be substituted for up to 10 mole percent of the titanium.

In short, all of the three identified patents relate only to a spinel crystal system in which metal ion substitutions may be made, that is, one metal ion for another.

SUMMARY OF THE INVENTION

The principal object of the present invention is to provide an improved inorganic pigment based on multiple spinels and a process for its preparation. The present pigments are not solid solutions of a single crystal structure with metal ions substituted for other metal ions. Rather, the present pigments are solid solutions of a cubic spinel crystal structure and spinel-forming metal oxides of at least one other and preferably two other differing spinels, the two or more other spinels being merged together in a single phase, solid solution physical form.

In an accurate and genuine sense, the present spinel solid solution comprises a solvent spinel containing within its crystal the spinel-forming metal oxides of at least a second, differing spinel as a solute spinel. Since the two or more spinel entities of the present pigments are mutually soluble and form a single phase relation, it is possible easily to vary the colors produced by present pigments over a wide range, if desired, or over a slight change, almost imperceptible to the eye, merely by changing the compositional make-up of either the host oxides of one or more additional spinels, or by varying the amount of any spinel entity.

More particularly, the cubic spinel crystal structure preferably corresponds to one of the following formulas, and the spinel-forming metal oxides of any additional spinel present in proportions inter se to correspond to a different one of the following formulas:

1. $A^{+2}B_2^{+3}O_4$,
2. $A_2^{+2}B^{+4}O_4$,
3. $A^{+1}B_5^{+3}O_8$,
4. $A_4^{+1}B_5^{+4}O_{12}$,
5. $A_2^{+1}B^{+2}C_3^{+4}O_8$, in which A, B and C are ions of metals having a valence indicated by the associated exponents for each formula, and in which each of A, B and C of the spinel-forming metal oxides has an ionic radius no greater than 1.1 angstroms.

The pigments of the present invention are prepared for forming the multiple spinel in a calcining operation. The multiple spinel pigment is a single phase solid solution of a first spinel and the spinel-forming metal oxides of at least one other spinel entity. Solid solutions of three spinel entities are easily obtained, although additional spinels can be similarly accomodated in a single phase solid solution. It is merely a matter of solubility, one spinel with another. In the case, for example, of forming a double spinel pigment, the calcining operation may be based on two preformed spinels, or on one preformed spinel and a charge of spinel-forming components; or on two charges of spinel-forming components. In the last case, one charge survives as the cubic spinel crystal structure, and the second charge defines the spinel-forming metal oxides dissolved within the crystal of the first spinel. The spinel defining the host crystal structure has a sufficiently large lattice constant to receive the other spinel entity or entities. A calcining temperature is dictated by the physcial properties of the spinels being used but usually extends from about 750° C to a temperature just short of which the clacining materials melt.

BRIEF DESCRIPTION OF THE DRAWING

In the accompany drawing.

DESCRIPTION OF THE PREFERRED EMBODIMENTS

Figure 1:
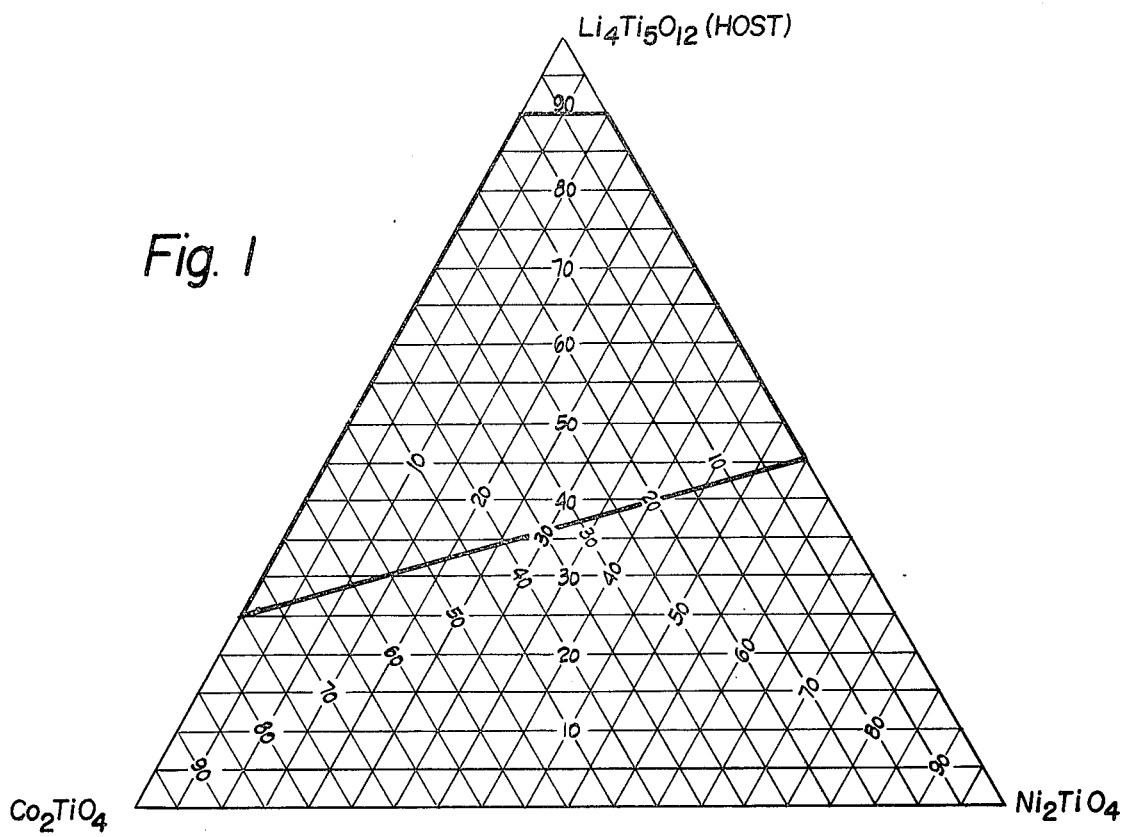
FIGS. 1 through 7 are triaxial drawings representing seven preferred embodiments of the invention and provide mole percentages of a solid solution of a first or host spinel and a second spinel; of a first spinel and a third spinel; and of a solid solution encompassing all three spinels.

While pigments of a plurality of spinels joined in solid solution, as herein defined, are contemplated by the present invention and the following disclosure is applicable to such pigments of multiple spinels, the preferred form comprises double and triple spinels. The following description is directed chiefly to these forms.

In general, a pigment of the present invention comprises a host spinel crystal structure, sometimes herein designated as the first spinel, into which are incorporated spinel-forming metal oxides, present in ratio or proportions inter se adapted to lead to spinel formation. Bright, intense pigments result. A unit cell of a cubic spinel crystal structure has 32 octahedral sites of which eight are normally occupied, and 64 tetrahedral sites of which 16 are normally occupied. In accordance with the present invention, some or all of the available sites are occupied by adding (not susbstituting) spinel-forming metal oxides present in proportion adapted to form at least a second spinel.

More, particularly, in one form of the invention, a first spinel crystal structure and spinel-forming metal oxides representing a second spinel are combined to form a solid solution comprising a cubic spinel crystal structure of the first spinel containing dissolved within that structure the spinel-forming metal oxides of the other spinel. By analogy, the first spinel of the present invention may be likened to a sponge which absorbs another medium, represented by the spinel-forming metal oxides. Indeed, it is precisely because of the two spinel entities are not rigidly related to one to the other, like atoms in a conventional chemical formula, that they can be widely varied in amounts, like any solvent and solute which are soluble in all or most all proportions. Yet, it is possible to represent a particular, given multiple spinel pigment by a formula, since the ultimate pigment structure results from the combination of at least two spinel formulas.

The first spinel corresponds to one formula, and the spinel-forming metal oxides are present in proportions corresponding to a different formula. Such formulas preferably include the following:

1. $A^{+2}B_2^{+3}O_4$,
2. $A_2^{+2}B^{+4}O_4$,
3. $A^{+1}B_5^{+3}O_8$,
4. $A_4^{+1}B_5^{+4}O_{12}$,
5. $A_2^{+1}B^{+2}C_3^{+4}O_8$, in which A, B and C are ions of metals having a valence indicated by the associated exponents for each formula, and in which each of A, B and C of the spinel-forming components has an ionic radius no greater than about 1.1 angstroms. The total positive charge of the metal ions in any one of the formulas equals the total negative valence charge of the oxygen to maintain electrical neutrality.

Thus, Formula 1 is read one ion of a divalent metal, plus two ions of a trivalent metal, and four ions of oxygen; Formula 2 means two ions of a divalent metal, one ion of a tetravalent metal, and four ions of oxygen; Formula 3 means one ion of a monovalent metal, five ions of a trivalent metal, and eight ions of oxygen; Formula 4 means four ions of a monovalent metal, five ions of a tetravalent metal, and twelve ions of oxygen, and Formula 5 means two ions of a monovalent metal, one ion of a divalent metal, three ions of a tetravalent metal, and eight ions of oxygen.

Of the five formulas, Formula 1 is least preferred because of its cubic structure is relatively small and therefore more difficult to add the second spinel entity. Formulas 3, 4 and 5 work very well and are most preferred.

Literally, any known metal ion listed in the Periodic Table of the Elements can be used in the five spinel formulas, as long as a metal which is part of a spinel-forming metal oxide serving to define the second or third spinel has an ionic radius no greater than 1.1 angstroms. Indeed, silicon, which is not generally regarded as a metal, is operative in the present multiple spinel pigments, for example, in a spinel like $Ni_2SiO_4$. Accordingly, as used here and in the claims, the term "metal ion" and forms thereof are taken to include silicon. A limiting ionic radius arises for additive spinel metal oxides, because ionic radii of metals greater than about 1.1 angstroms simply cannot physically fit within the first spinel crystal structure. Examples of limiting ionic radii are those for sodium which has an ionic radius of about 1.0 angstrom and cadmium which has an ionic radius of about 1.1 angstroms.

The preferred multiple spinel pigments are formed from only certain metal ions. Referring to the five previously indicated spinel formulas, in the preferred embodiments A is a monovalent metal ion selected from the group consisting of Li, Na, K, and Ag, or a divalent metal ion selected from the group consisting of Mg, Mn, Fe, Co, Ni, Cu, Zn, and Cd; B is a divalent metal ion selected from the group consisting of Mg, Cu, Mn, Fe, Co, Ni, Zn, and Cd; or a trivalent metal ion selected from the group consisting of Al, Cr, Fe, Ga, In, La, and V; or a tetravalent metal ion selected from the group consisting of Ti, Sn, Mn, V, Si, and Ge; and C is a tetravalent metal ion selected from the group consisting of Ti, Sn, Mn, V, Si, and Ge.

In general, the first spinel crystal structure may be considered to be the host and is usually, but not necessarily, present in greater amount; and the spinel-forming metal oxides may be considered the additive. As a rule relative proportions are not critical. As long as about 0.5 mole percent of one spinel entity is present with the other, advantages of the present invention may be obtained. Most pigment compositions contain in mole percent from about 20% to about 99% of the first spinel crystal structure and from about 1% to about 80% of the spinel-forming metal oxides of the second, third or additional spinels.

The two or more spinel entities are present only as a single phase solid solution. This means that for any given system, if a single phase is to be preserved, the solute spinel-forming metal oxides can be added to the solvent spinel only up to the limits of saturation permitted by that system. If more solute spinel is then added, a double phase solid solution forms. The presence of such double or multiple phase systems does not necessarily destroy the effectiveness of the desired single phase pigment, although it is preferred that the pigment be entirely single phase.

When a multiple spinel pigment is formed in accordance with the present invention, one spinel dominates or survives to form a host cubic crystal structure. Sites of the host crystal are then occupied by the spinel-forming metal oxides of one or more other spinel entities. The latter, sometimes herein referred to as the second or third spinels, lose their identities and become part of the crystal structure of the first spinel. That spinel which survives as the cubic crystal lattice, sometimes herein referred to as the first spinel, is not determined as one might expect by being present in a predominant amount. Although it cannot as yet be stated as an absolute fact, all of the work to date indicates that the spinel which becomes the host crystal is usually the one having the larger or largest lattice constant, that is, the length of one side of its cubic structure, usually designated $a_o$ and measured in angstroms.

Indeed, it can be shown by X-ray diffraction that in solid solutions of the present pigments the host crystal lattice can undergo a slight lattice expansion when the spinel-forming metal oxides are added although not necessarily. In any case, the crystal lattice of the host crystal stays the same or slightly decreases as the metal oxides are added. This is contrary to what one would expect based on Vegard's Law. For example, if $Li_2CoTi_3O_8$ and $CoAl_2O_4$ are mixed in proportions ranging from 0% to 100% for each spinel, according to Vegard's Law the average lattice of the crystals in the mixture is shown by a straight line relation connecting the lattice constant of each spinel alone. However, nothing of the sort occurs in solid solutions of the present multiple spinels. X-ray diffraction of solid solution shows that the lattice constant of $Li_2CoTi_3O_8$ not only stays substantially the same but can slightly increase as the cubic structure of this spinel expands due to added spinel metal oxides within the crystal structure. However, the lattice can expand only so far. This increase in lattice constant continues until the first spinel ($Li_2CoTi_3O_8$) can no longer accept the metal oxides of a second spinel. In short, the first spinel becomes saturated with the second. At this point, the solid solution no longer is a single phase but separates into a double phase. An X-ray diffraction diagram of the double phase now shows two crystal lattices, namely, one corresponding to the saturated host spinel and one corresponding generally to the second spinel formed from the spinel-forming metal oxides. The saturated host spinel represents one instance of the present invention.

Accordingly, the cubic spinel crystal structure of the solid solution of a present pigment normally has a lattice constant at least substantially equal to the lattice constant of the first or host spinel crystal lattice structure taken alone. While, as indicated, the present pigments are preferably single phase, the pigments may unavoidably also contain some double phase, especially if proportions close to the saturation limits are used. While some of the indicated double phase can be used without departing from the advantages of the invention, the inclusion of a double phase tends to reduce the brilliance of the colors of the pigments and impart a muddy, rather washed out hue. Such pigments are still useful. Indeed, some pigment applications require a less brilliant hue. As a general rule, the first spinel becomes saturated with a second added spinel when their molar ratio reaches 1:1; respectively.

To illustrate the steady or relative steady lattice constant of a present pigment, if 0.2 mole of $Li_2MgTi_3O_8$, having a lattice constant of 8.37 is combined with 0.8 mole of $CoAl_2O_4$, having a lattice constant of 8.1, even though the latter spinel is present in greater amount, a single phase, double spinel pigment is formed having a lattice constant of 8.385 in which the former spinel is the host crystal lattice. Again, if one mole of $Li_4Ti_5O_{12}$, having a lattice constant of 8.4, one mole of $CoAl_2O_4$, having a lattice constant of 8.1, and one mole of $MgCr_2O_4$ having a lattice constant of 8.2 are combined to form a single phase pigment as herein described, the lattice constant of the resulting solid solution is that of the spinel having the largest lattice constant, namely 8.4.

With the foregoing as a background, the differences of the present pigments over those of the prior art may be clearly perceived. In prior work with spinel pigments, a metal ion was substituted in a spinel crystal structure for another metal ion already there. Thus, as exemplified by the cited U.S. Pat. No. 3,424,551 to Owen, in a spinel like $Li_2CoTi_3O_8$, the practice has been to substitute for part or all of the cobalt. As an example, a half mole of nickel could be substituted for a half mole of cobalt, forming a spinel pigment having the formula $Li_2(Co_{0.5}Ni_{0.5})Ti_3O_8$; or less than half a mole such as 0.2 mole of zinc could be substituted for the cobalt, forming a spinel pigment having the formula $Li_2(Co_{0.8}Zn_{0.2})Ti_3O_8$.

As another example, in the spinel $Zn_2TiO_4$, prior practice substituted for the zinc, such as one-half mole of each of cobalt and nickel for a mole of zinc to form a spinel pigment having the formula $Zn(Co_{0.5}Ni_{0.5})TiO_4$. In instances like these, the number of ions left of the original metal plus the number of ions of the substituting metal equal the number of ions of the original metal initially contained in the formula.

In contrast, a present pigment is a combination or addition or two or more spinels and not replacement, as illustrated by the following equation:

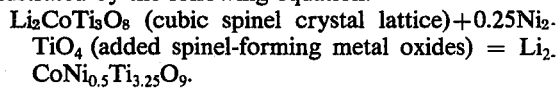

Another example of the formation of a present pigment is the equation:

It will be noted that decimal subscripts occur when spinel entities are combined in other than equal molar proportions.

The best pigments are those containing lithium and especially those in which the host spinel contains lithium. A preferred class of pigments are spinel solid solutions having $Li_2MTi_3O_8$ as the host spinel in which M is a metal ion having a valence of two. Further examples of preferred pigments based on such a host are $Li_4CoAl_2Li_5O_{16}$ and $Li_2Co_2Al_2Li_3O_{12}$. FIGS. 1 through 7 are triaxial composition diagrams of seven of the preferred pigments. Compositions are in mole percent. In all figures, the host spinel has been indicated at the upper triangular corner, and the other two spinels (obtained from spinel-forming oxides or from components forming such oxides) are placed at the other two corners. Thus, FIG. 1 represents a double spinel pigment comprising from about 25% to about 90% $Li_4Ti_5O_{12}$ and from about 10% to 75% $Co_2TiO_4$; another double spinel pigment comprising from about 45% to about 90% $Li_4Ti_5O_{12}$ and from about 10% to about 55% of $Ni_2TiO_4$; and a triple spinel pigment comprising $Li_4Ti_5O_{12}$, $Co_2TiO_4$, and $Ni_2TiO_4$ in all proportions which form a single phase solid solution as represented by the enclosed area of FIG. 1. Those portions of FIG. 1 outside the enclosed areas, as in the other figures, represent double phase systems.

Figure 2:
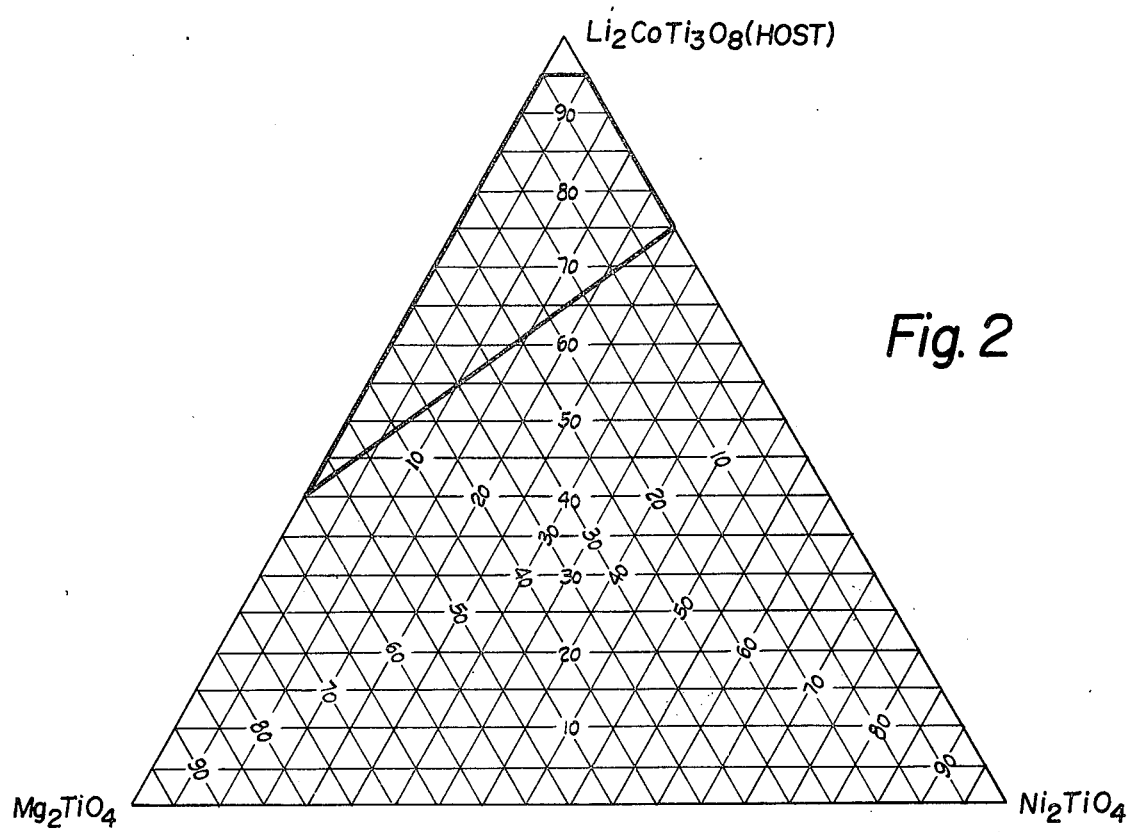

FIG. 2 represent a double spinel pigment comprising from about 40% to about 95% of $Li_2CoTi_3O_8$ and from about 5% to about 60% $Mg_2TiO_4$; another double spinel pigment comprising from about 75% to about 95% $Li_2CoTi_3O_8$ and from about 5% to about 25% of $Ni_2TiO_4$; and a triple spinel pigment comprising $Li_2CoTi_3O_8$, $Mg_2TiO_4$ and $Ni_2TiO_4$ in all proportions which form a single phase solid solution as represented by the enclosed area of FIG. 2.

Figure 3:
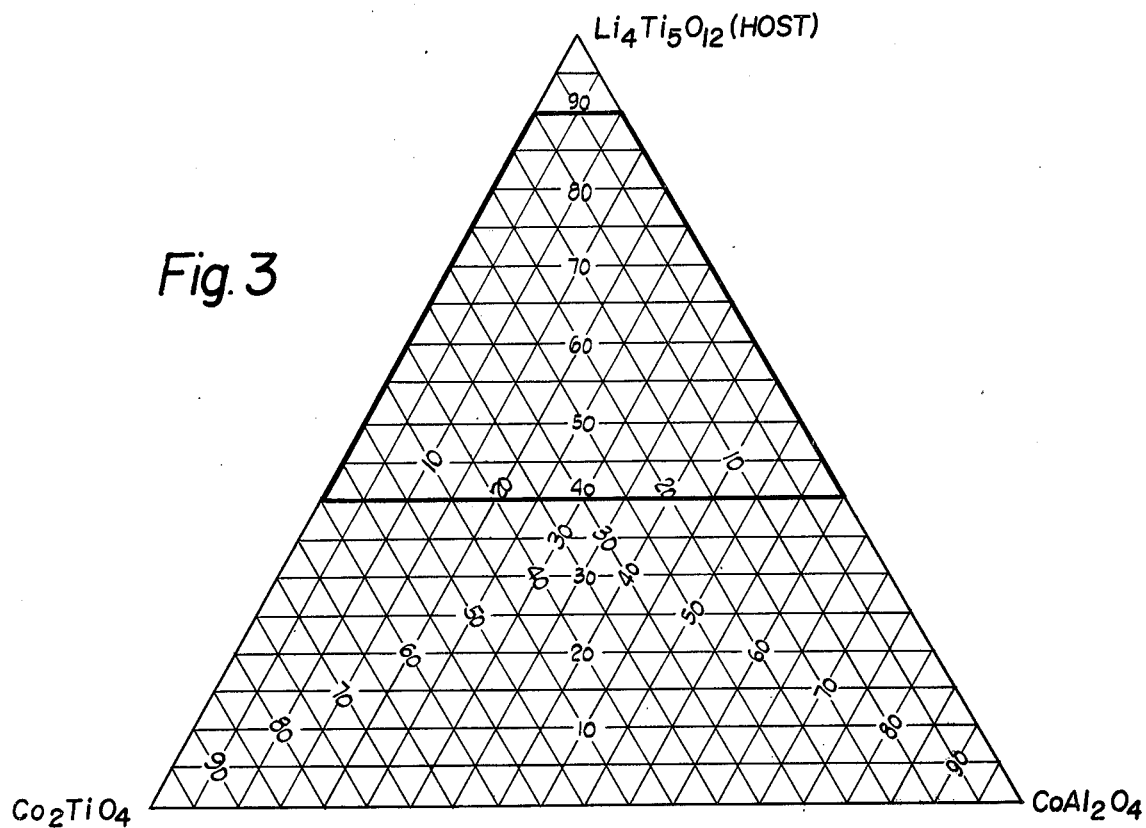

FIG. 3 represents a double spinel pigment comprising from about 40% to about 90% $Li_4Ti_5O_{12}$ and from about 10% to about 60% $Co_2TiO_4$; another double spinel pigment comprising from about 40% to about 90% $Li_4Ti_5O_{12}$ and from about 10% to about 60% $CoAl_2O_4$; and a triple spinel pigment comprising $Li_4Ti_5O_{12}$, $Co_2TiO_4$ and $CoAl_2O_4$ in all proportions which form a single phase solid solution as represented by the enclosed area of FIG. 3.

Figure 4:
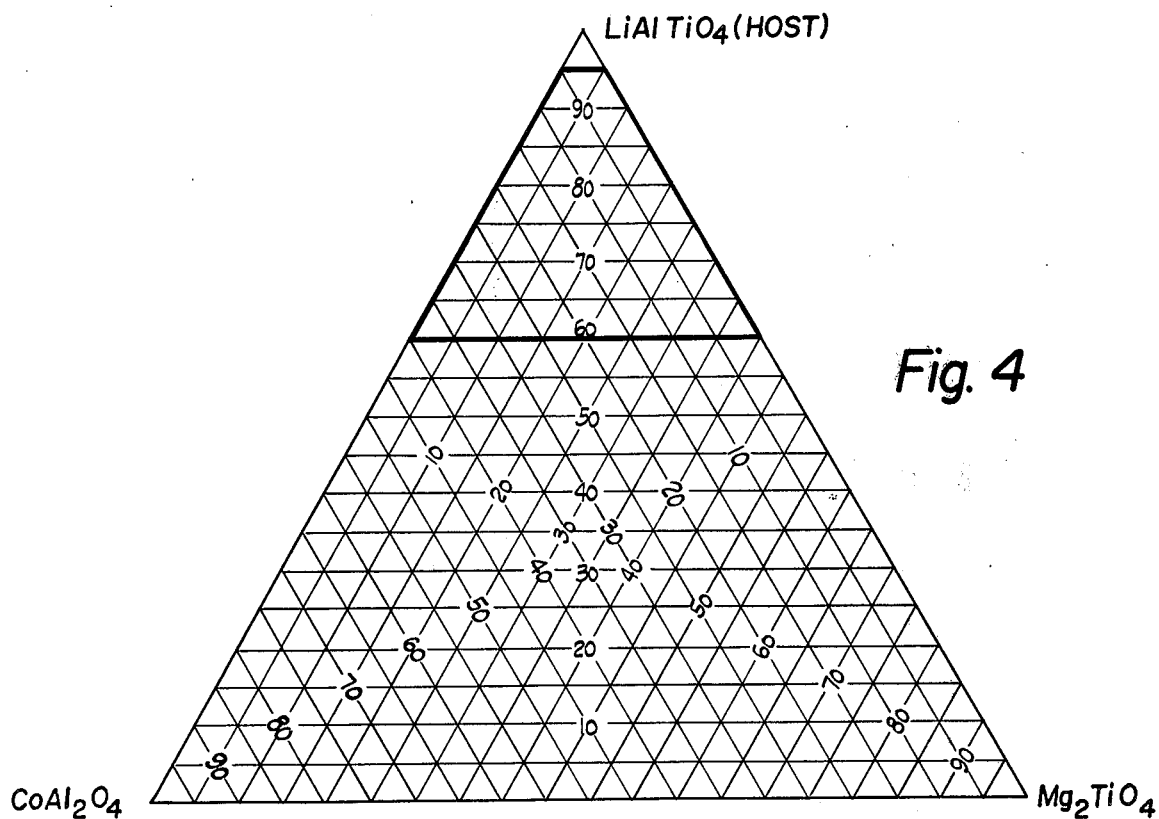

FIG. 4 represents a double spinel pigment comprising from about 60% to about 95% $LiAlTiO_4$ and from about 5% to about 40% $CoAl_2O_4$; another double spinel pigment comprising from about 60% to about 95% $LiAlTiO_4$ and from about 5% to about 40% $Mg_2TiO_4$; and a triple spinel pigment comprising $LiAlTiO_4$, $CoAl_2O_4$ and $Mg_2TiO_4$ in all proportions which form a single phase solid solution as represented by the enclosed area of FIG. 4.

Figure 5:
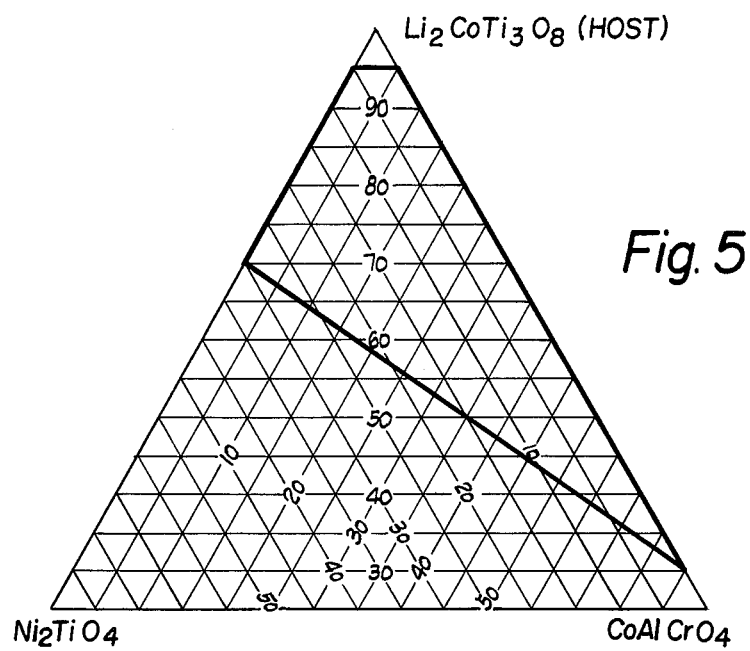

FIG. 5 represents a double spinel pigment comprising from about 70% to about 95% $Li_2CoTi_3O_8$ and from about 5% to about 30% $Ni_2TiO_4$; another double spinel pigment comprising from about 30% to about 95% $Li_2CoTi_3O_8$ and about 5% to about 70% $CoAlCrO_4$; and a triple spinel pigment comprising $Li_2CoTi_3O_8$, $Ni_2TiO_4$ and $CoAlCrO_4$ in all proportions which form a single phase solid solution as represented by the enclosed area of FIG. 5.

Figure 6:
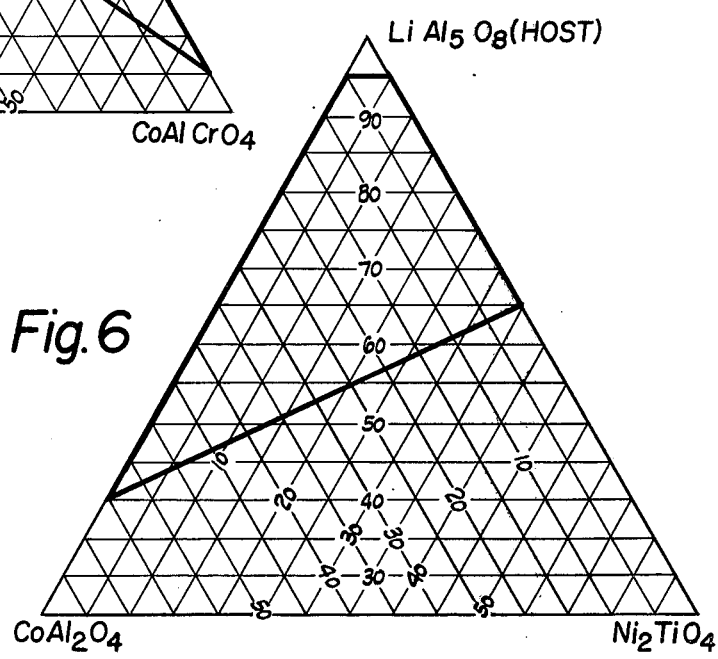

FIG. 6 represents a double spinel pigment comprising from about 40% to about 95% $LiAl_5O_8$ and from about 5% to about 60% $CoAl_2O_4$; another double spinel pigment comprising from about 65% to about 95% $LiAl_5O_8$ and from about 5% to about 35% $Ni_2TiO_4$; and a triple spinel pigment comprising $LiAl_5O_8$, $CoAl_2O_4$ and $Ni_2TiO_4$ in all proportions which form a single phase solid solution as represented by the enclosed area of FIG. 6.

Figure 7:
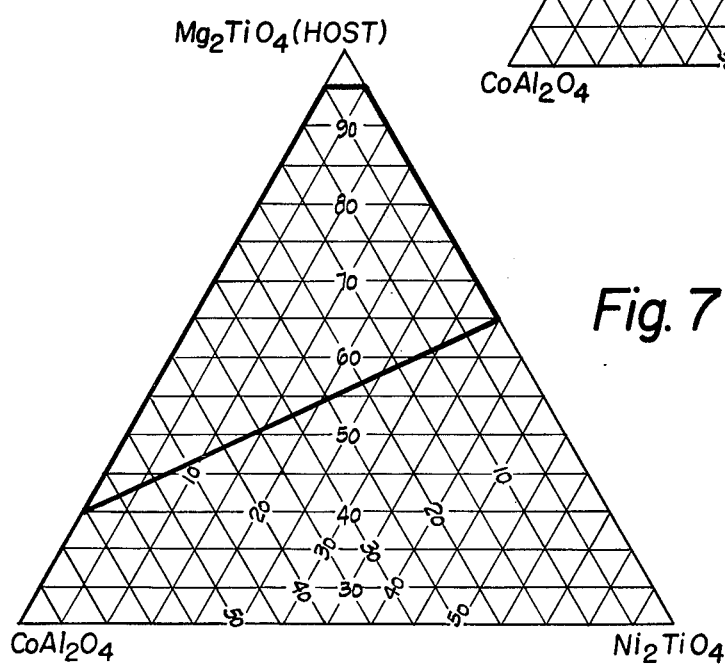

FIG. 7 represents a double spinel pigment comprising from about 40% to about 95% $Mg_2TiO_4$ and from about 5% to about 60% $CoAl_2O_4$; another double spinel pigment comprising from about 65% to about 95% $Mg_2TiO_4$ and from about 5% to about 35% $Ni_2TiO_4$; and a triple spinel pigment comprising $Mg_2TiO_4$, $CoAl_2O_4$ and $Ni_2TiO_4$ in all proportions which form a single phase solid solution as represented by the enclosed area of FIG. 7.

The pigments are prepared by forming a first spinel cubic crystal structure and then dissolving within that structure the spinel-forming metal oxides of at least a second spinel to form a solid solution of the cubic spinel crystal lattice and the spinel-forming metal oxides. The first spinel preferably corresponds to one of the five previously disclosed spinel formulas, and the spinel-forming metal oxides are present in proportions to correspond preferably to a different one or more of the same group of formulas. The solid solution of the two or more spinel entities is formed by a calcining operation and subsequent cooling.

Preferably, the preparation of a multiple spinel pigment comprises calcining together at a calcining temperature a mixture of at least two different charges of spinel-forming components. One charge survives as the first spinel crystal structure, and the other charge defines the spinel-forming metal oxides dissolved within that structure. However, it is possible to form pigments by calcining together at the calcining temperature a preformed spinel crystal structure preferably conforming to one of the previously disclosed five spinel formulas and defining the first spinel, and a charge of spinel-forming components which are, or convert to, the spinel-forming metal oxides that are dissolved within that structure to form the solid solution. It is also possible to form pigments by calcining together at a calcining temperature two preformed spinel crystal structures preferably conforming to two different spinels of the previously disclosed five spinel formulas. In any case, the materials are preferably intimately blended prior to calcination. The same rationale applies to three or more spinel entities.

As a rule, if a preformed spinel is used at all, one is used to form the host cubic crystal structure and therefore one which has a sufficiently large lattice constant to receive another spinel entity. However, especially where charges of two preformed spinels are calcined together, the actual system which eventuates is largely determined by thermodynamic principles which favor that system of the present solid solutions having the lowest energy state.

The calcining temperature may extend from about 750° C to a temperature just short of which the calcining materials melt. In general, this temperature usually does not exceed about 1350° C. The crystals form at relatively high temperatures and before the calcined mass cools. There is little or no residue from the calcining operation, especially, if the amounts charged to calcination are in the proper respective quantities according to the five spinel formulas previously given. If desired, standard ceramic fluxes can be included in the charge to calcination to lower the requisite calcining temperature. Such fluxes comprise sodium nitrate, calcium sulfate, boron oxide, sodium fluoride, potassium fluoride, and the like.

As indicated by the previously disclosed five formulas, the first spinel and the second or other added spinels are compounds of metal oxides which are combined in the present solid solutions in suitable proportions to form spinels. While it is possible to prepare the multiple spinel pigments directly from metal oxides as starting materials, the preferred practice is to use other metal compounds which are converted to oxide form by heat. Such other metal compounds include the hydroxides and the acid salts of the metals used, such as the nitrates, sulfates, sulfides, carbonates, acetates and the like. Compounds which are converted into oxides when heated in the presence of water, for example titanium chloride, may also be employed as starting calcining materials. As used here and in the claims, the term "spinel-forming components" and forms thereof means the metal oxide itself or a metal compound capable of being converted by heat to the oxide state to form the spinel-forming metal oxides.

It will be understood that minimum amounts of other ingredients can be present in the present pigments as a diluent, impurity, or other additive without losing the advantages of the present invention. Such diluents and the like may include any metal oxide which might not otherwise be present in one of the spinels of the multiple spinel pigments. Normally, a diluent, impurity or other additive can be present in an amount up to about 5% by weight of the pigment without seriously affecting the color and in some instances may even provide a desired off-shade. The diluent or other like material can be present in the pigment in two ways. It can be either physically admixed with the spinel outside of the crystal structure, or the diluent can penetrate the lattice itself, either interstitially or substitutionally.

The following examples are intended only to illustrate the invention and should not be construed to impose limitations on the claims.

EXAMPLE 1

This example typlifies the preparation of a multiple spinel in accordance with the present invention. A mixture consisting of 0.74 gram (0.01 mole) of $Li_2CO_3$, 1.18 grams (0.1 mole) of $CoCO_3$, 2.60 grams (0.0325 mole) of $TiO_2$, and 0.59 gram (0.005 mole) of $NiCO_3$ was ground in a mortar in acetone, dried, and then fired for one hour at 950° C in air. The residue was again ground in acetone and refired for one additional hour at 950° C in air to insure good mixing.

An X-ray diffraction analysis of the resulting blue-green pigment showed a solid solution single phase cubic spinel structure. In the solid solution, the cubic spinel structure was the host spinel, $Li_2CoTi_3O_8$, and the spinel-forming metal oxides defining the second spinel were $NiO_2$ and $TiO_2$.

EXAMPLES 2 THROUGH 17

Table A provides 16 additional examples of multiple spinels, all of which were prepared by calcination in a manner similar to that described for Example 1. Table A provides an identification of the host spinel crystal and the additive spinel for each example, as well as the relative mole percent of each in the pigment formed, and the lattice constants for the host, additive and pigment. The lattice constant of at least the pigment solid solution was obtained by X-ray diffraction. When the host spinel and additive spinel are combined in equal molar quantity, that is, a molar ratio of 1:1, the formula of the resulting double spinel pigment is simply the addition of the metal ions of the two spinels involved. When the host spinel and additive spinel are combined in other than an equal molar quantity, Table A shows the formula of the resulting double spinel with decimal subscripts.

Table A contains examples of all of the previously disclosed, exemplary five spinel formulas which may be embodied in the present pigments. For example, the additive spinels of Examples 3, 7 and 11 correspond to Formula 1; the additive spinels of Examples 2, 5 and 6 correspond to Formula 2; the host spinels of Examples 7 and 8 correspond to Formula 3; the host spinels of Examples 3 and 10 correspond to Formula 4; and the host spinels of Examples 2, 4, 5 and 16 correspond to Formula 5.

For examples of spinel pigments based on three spinel entities, reference is made to the triaxial areas of FIGS. 1 through 7.

EXAMPLE 18

This example illustrates the use of a preformed spinel and a charge of spinel-forming metal oxides in preparing a double spinel solid solution of the present invention. A spinel, $Li_2CoTi_3O_8$, representing the preformed spinel was mixed and ground with NiO and $TiO_2$, representing the spinel-forming oxides, in a molar ratio of 1:0.5:0.25, respectively. The mixture was then calcined at 970° C for 3 hours. A spinel was obtained corresponding in formula and structure to that of Example 2 of Table A.

EXAMPLE 19

This example illustrates the use of two preformed spinels in preparing a double spinel solid solution of the present invention. The two preformed spinels used were $Li_2CoTi_3O_8$ and $CoAl_2O_4$. A ground mixture containing equal molar quantities of these spinels was calcined at 970° C for 3 hours. A spinel was obtained corresponding in formula and structure to that of Example 15 of Table A.

The procedure of Examples 18 and 19 are similarly followed when pigments of three of more spinel entities are made.

One reason why the amount of added spinel-forming metal oxides can range so widely with respect to the amount of the first spinel is that often only small amounts are needed to obtain the ultimate colors sought. For example, if a host cubic spinel is yellow in color, it may need only a relatively small amount of an added spinel to obtain a bright, attractive chartreuse. In general, amounts of the added spinel needed, and to some extent the type of spinel additive needed, can be determined as a result of the present invention with almost computer-like precision. One can determine the

TABLE A

Examples 2 through 17
Double Spinel Compositions

| | Solid Solution Pigment | | Host Crystal | | Mole | Additive | | |
|---|---|---|---|---|---|---|---|---|
| Example | Formula | Crystal Lattice, A | Formula | Crystal Lattice, A | of Pigment | Formula | Crystal Lattice, A | % of Pigment |
| 2 | $Li_2CoNi_{0.5}Ti_{3.25}O_9$ | 8.38 | $Li_2CoTi_3O_8$ | 8.39 | 80.0 | $Ni_2TiO_4$ | 8.40 | 20.0 |
| 3 | $Li_4CoAl_2Ti_5O_{16}$ | 8.38 | $Li_4Ti_5O_{12}$ | 8.41 | 50.0 | $CoAl_2O_4$ | 8.10 | 50.0 |
| 4 | $Li_2MgCo_{0.5}CrTi_3O_{10}$ | 8.37 | $Li_2MgTi_3O_8$ | 8.38 | 66.66 | $CoCr_2O_4$ | 8.30 | 33.33 |
| 5 | $Li_2NiCo_{0.5}Ti_{3.25}O_9$ | 8.38 | $Li_2NiTi_3O_8$ | 8.40 | 80.0 | $Co_2TiO_4$ | 8.40 | 20.0 |
| 6 | $Li_2Co_{1.25}Cd_{0.25}Ti_{3.25}O_9$ | 8.40 | $Li_2CoTi_3O_8$ | 8.39 | 80.0 | $CoCdTiO_4$ | 8.47 | 20.0 |
| 7 | $LiAl_3CoO_{12}$ | 8.10 | $LiAl_5O_8$ | 7.93 | 50.0 | $CoAl_2O_4$ | 8.10 | 50.0 |
| 8 | $LiAl_3Co_2TiO_{12}$ | 8.10 | $LiAl_5O_8$ | 7.93 | 50.0 | $Co_2TiO_4$ | 8.40 | 50.0 |
| 9 | $Li_2ZnCoCr_2Ti_3O_{12}$ | 8.39 | $Li_2ZnTi_3O_8$ | 8.40 | 50.0 | $CoCr_2O_4$ | 8.30 | 50.0 |
| 10 | $Li_4Co_2Ti_6O_{16}$ | 8.40 | $Li_4Ti_5O_{12}$ | 8.41 | 50.0 | $Co_2TiO_4$ | 8.40 | 50.0 |
| 11 | $Li_2NiZnFe_2Ti_3O_{12}$ | 8.38 | $Li_2NiTi_3O_8$ | 8.40 | 50.0 | $ZnFe_2O_4$ | 8.39 | 50.0 |
| 12 | $Li_{1.6}Na_{0.4}CoNi_{0.5}Ti_{3.25}O_9$ | 8.40 | $Li_{1.6}Na_{0.4}CoTi_3O_8$ | 8.40 | 80.0 | $Ni_2TiO_4$ | 8.40 | 20.0 |
| 13 | $Zn_2Li_2CoTi_4O_{12}$ | 8.49 | $Zn_2TiO_4$ | 8.47 | 50.0 | $Li_2CoTi_3O_8$ | 8.38 | 50.0 |
| 14 | $Mg_2Li_2CoTi_4O_{12}$ | 8.44 | $Mg_2TiO_4$ | 8.44 | 50.0 | $Li_2CoTi_3O_8$ | 8.38 | 50.0 |
| 15 | $Li_2Co_2Al_2Ti_3O_{12}$ | 8.40 | $Li_2CoTi_3O_8$ | 8.39 | 50.0 | $CoAl_2O_9$ | 8.10 | 50.0 |
| 16 | $Li_2MgCoAl_2Ti_3O_{12}$ | 8.40 | $Li_2MgTi_3O_8$ | 8.38 | 50.0 | $CoAl_2O_4$ | 8.10 | 50.0 |
| 17 | $Li_2MgCo_2Al_4Ti_3O_{16}$ | 8.40 | $Li_2MgTi_3O_8$ | 8.38 | 33.3 | $CoAl_2O_4$ | 8.10 | 66.7 | responsive wave length needed and then incorporate that additive spinel which changes a given wave length of the host spinel to the wave length desired.

Although the foregoing describes presently preferred embodiments of the present invention, it is understood that the invention may be practiced is still other forms within the scope of the following claims.

I claim:

1. A multiple spinel inorganic pigment comprising a first spinel crystal structure and spinel-forming metal oxides of at least a second spinel, said first and spinel-forming oxides being combined as a solid solution comprising a cubic spinel crystal structure of said first spinel and containing dissolved witin said structure the spinel-forming metal oxides of said at least second spinel, said first spinel corresponding to one of the following formulas, and said spinel-forming metal oxides being present in proportions inter se to correspond to a different one of the following formulas:

$A^{+2}B_2^{+3}O_4$,
$A_2^{+2}B^{+4}O_4$,
$A^{+1}B_5^{+3}O_8$,
$A_4^{+1}B_5^{+4}O_{12}$, or
$A_2^{+1}B^{+2}C_3^{+4}O_8$, in which A, B and C are ions of metals having a valence indicated by the associated exponents, and in which each of A, B and C of the spine-forming metal oxides has an ionic radius no greater than about 1.1 angstroms, said first spinel and said at least second spinel being present in all proportions forming a single phase solid solution.

2. A multiple spinel inorganic pigment comprising a first spinel crystal structure and spinel-forming metal oxides of one or more of a second and third spinel, said first spinel and spinel-forming oxides being combined as a solid solution comprising a cubic spinel crystal structure of said first spinel and containing dissolved within said structure the spinel-forming metal oxides of one or more of said second and third spinels, said first spinel corresponding to one of the following formulas, and said spinel-forming metal oxides of said second and third spinels being present in proportions inter se for each spinel to correspond to a different one of the following formulas:

$A^{+2}B_2^{+3}O_4$,
$A_2^{+2}B^{+4}O_4$,
$A^{+1}B_5^{+3}O_8$,
$A_4^{+1}B_5^{+4}O_{12}$, or
$A_2^{+1}B^{+2}C_3^{+4}O_8$, in which A, B and C are ions of metals having a valence indicated by the associated exponents, and in which each of A, B and C of the spinel-forming metal oxides has an ionic radius no greater than about 1.1 angstroms, said spinels being present in all proportions forming a single phase solid solution said first spinel and one or more of said second and third spinels.

3. The inorganic pigment of claim 2 in which A is a monovalent metal ion selected from the group consisting of Li, Na, K, and Ag, or a divalent metal ion selected from the group consisting of Mg, Mn, Fe, Co, Ni, Cu, Zn, and Cd; B is a divalent metal ion selected from the group consisting of Mg, Cu, Mn, Fe, Co, Ni, Zn, and Cd; or a trivalent metal ion selected from the group consisting of Al, Cr, Fe, Ga, In, La and V; or a tetravalent metal ion selected from the group consisting of Ti, Sn, Mn, V, Si, and Ge; and C is a tetravalent metal ion selected from the group consisting of Ti, Sn, Mn, V, Si, and Ge, provided that the total positive charge of the metal ions in any of said formulas equals the total negative charge of oxygen to maintain electrical neutrality.

4. The inorganic pigment of claim 2 in which said first spinel crystal structure generally corresponds to the formula, $Li_2MTi_3O_8$, in which M is a metal ion having a valence of two.

5. The inorganic pigment of claim 2 in which said solid solution generally corresponds to the formula: $Li_2CoNi_{0.5}Ti_{3.25}O_9$.

6. The inorganic pigment of claim 2 in which said solid solution generally corresponds to the formula: $Li_4CoAl_2Ti_5O_{16}$.

7. The inorganic pigment of claim 2 in which said solid solution generally corresponds to the formula: $Li_2Co_2Al_2Ti_3O_{12}$.

8. The inorganic pigment of claim 2 further containing as a diluent up to about five percent by weight of the pigment of a metal oxide.

9. The inorganic pigment of claim 1 in which said pigment comprises in mole percent from about 20% to about 99% of said first spinel crystal lattice structure and from about 1% to about 80% of said spinel-forming metal oxides.

10. The inorganic pigment of claim 2 in which said first spinel crystal lattice structure corresponds to the formula: $A^{+1}B_5^{+3}O_8$.

11. The inorganic pigment of claim 2 in which said first spinel crystal lattice structure corresponds to the formula: $A_4^{+1}B_5^{+4}O_{12}$.

12. The inorganic pigment of claim 2 in which said first spinel crystal lattice structure corresponds to the formula: $A_2^{+1}B^{+2}C_3^{+4}O_8$.

13. A multiple spinel inorganic pigment comprising a solid solution of a solvent spinel containing within its crystal structure the spinel-forming metal oxides of at least a second differing spinel as a solute spinel.

14. A multiple spinel inorganic pigment comprising the enclosed area of FIG. 1.

15. A multiple spinel inorganic pigment comprising the enclosed area of FIG. 2.

16. A multiple spinel inorganic pigment comprising the enclosed area of FIG. 3.

17. A multiple spinel inorganic pigment comprising the enclosed area of FIG. 4.

18. A multiple spinel inorganic pigment comprising the enclosed area of FIG. 5.

19. A multiple spinel inorganic pigment comprising the enclosed area of FIG. 6.

20. A multiple spinel inorganic pigment comprising the enclosed area of FIG. 7.

21. A process for preparing a multiple spinel inorganic pigment comprising forming a first spinel cubic crystal structure, dissolving within said structure spinel-forming metal oxides of at least a second spinel to form a single phase solid solution in all proportions of said cubic spinel crystal and said spinel-forming metal oxides of said at least second spinel, said first spinel corresponding to one of the following formulas, and said spinel-forming metal oxides being present in proportions inter se to correspond to a different one of the following formulas:

$A^{+2}B_2^{+3}O_4$,
$A_2^{+2}B^{+4}O_4$,
$A^{+1}B_5^{+3}O_8$,
$A_4^{+1}B_5^{+4}O_{12}$, or $A_2^{+1}B^{+2}C_3^{+4}O_8$, in which A, B and C are ions of metals having a valence indicated by the associated exponents for each formula, and in which each of A, B and C of the spinel-forming metal oxides has an ionic radius no greater than about 1.1 angstroms.

22. A process for preparing a multiple spinel inorganic pigment comprising forming a first spinel cubic crystal structure, dissolving within said structure spinel-forming metal oxides of one or more of a second and third spinel to form a single phase solid solution of said first spinel and one or more of said second and third spinels, said first spinel corresponding to one of the following formulas, and said spinel-forming metal oxides of said second and third spinels being present in proportions inter se for each spinel to correspond to a different one of the following formulas:

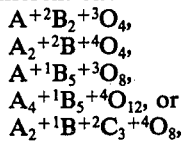

$A^{+2}B_2^{+3}O_4$,
$A_2^{+2}B^{+4}O_4$,
$A^{+1}B_5^{+3}O_8$,
$A_4^{+1}B_5^{+4}O_{12}$, or
$A_2^{+1}B^{+2}C_3^{+4}O_8$, in which A, B and C are ions of metals having a valence indicated by the associated exponents for each formula, and in which each of A, B and C of the spinel-forming metal oxides as an ionic radius no greater than about 1.1 angstroms.

23. The process of claim 22 in which A is a monovalent metal selected from a group consisting of Li, Na, K, and Ag, or a divalent metal ion selected from the group consisting of Mg, Mn, Fe, Co, Ni, Cu, Zn, and Cd; B is a divalent metal ion selected from the group consisting of Mg, Cu, Mn, Fe, Co, Ni, Zn, and Cd; or a trivalent metal ion selected from the group consisting of Al, Cr, Fe, Ga, In, La, and V; or a tetravalent metal ion selected from the group consisting of Ti, Sn, Mn, V, Si, and Ge; and C is a tetravalent metal ion selected from the group consisting of Ti, Sn, Mn, V, Si, and Ge, provided that the total valence positive charge of the metal ions in any of said formulas equals the total negative valence charge of the oxygen to maintain electrical neutrality.

24. The process of claim 22 in which said first spinel crystal structure generally corresponds to the formula, $Li_2MTi_3O_8$, in which M is a metal ion having a valence of two.

25. The process of claim 22 in which said solid solution generally corresponds to the formula: $Li_2CoNi_{0.5}Ti_{3.25}O_9$.

26. The process of claim 22 in which said solid solution generally corresponds to the formula: $Li_4CoAl_2Ti_5O_{16}$.

27. The process of claim 22 in which said solid solution generally corresponds to the formula: $Li_2Co_2Al_2Ti_3O_{12}$.

28. The process of claim 22 in which said forming step comprises calcining together at a calcining temperature at least two different charges of spinel-forming components, one charge surviving as said first spinel crystal lattice structure, at least one charge defining spinel-forming metal oxides dissolved within said lattice structure.

29. The process of claim 22 in which said forming step comprises calcining together at a calcining temperature a spinel crystal structure conforming to one of the formulas given in claim 22 and surviving as said first spinel, and at least one other charge of spinel-forming components convertible to spinel-forming metal oxides that are dissolved within said structure to form said solid solution.

30. The process of claim 22 in which said forming step comprises calcining together at a calcining temperature at least two spinel crystal structures conforming to two different formulas given in claim 22, one of said spinel structures surviving as said first spinel, and the other of said at least two spinel structures defining said spinel-forming metal oxides dissolved within the structure of the first spinel.

31. The process of claim 22 in which said forming step comprises calcining at a temperature within the range of about 750° C to about 1350° C.

32. The process of claim 21 in which said inorganic pigment comprises in mole percent from about 20% to about 99% of said first spinel crystal lattice structure, and from about 1% to about 80% of said spinel-forming metal oxides.

33. The process of claim 22 in which said first spinel crystal lattice structure corresponds to the formula: $A^{+1}B_5^{+3}O_8$.

34. The process of claim 22 in which said first spinel crystal lattice structure corresponds to the formula: $A_4^{+1}B_5^{+4}O_{12}$.

35. The process of claim 22 in which said first spinel crystal lattice structure corresponds to the formula: $A_2^{+1}B^{+2}C_3^{+4}O_8$.

36. A product produced by the process of claim 21.

37. A product produced by the process of claim 21 comprising a solid solution in which said first spinel serves as a solvent spinel and contains within its crystal said spinel-forming metal oxides as a solute spinel.

38. The process of claim 22 in which said solid solution comprises the enclosed area of FIG. 1.

39. The process of claim 22 in which said solid solution comprises the enclosed area of FIG. 2.

40. The process of claim 22 in which said solid solution comprises the enclosed area of FIG. 3.

41. The process of claim 22 in which said solid solution comprises the enclosed area of FIG. 4.

42. The process of claim 22 in which said solid solution comprises the enclosed area of FIG. 5.

43. The process of claim 22 in which said solid solution comprises the enclosed area of FIG. 6.

44. The process of claim 22 in which said solid solution comprises the enclosed area of FIG. 7.

* * * * *